(No Model.)
W. H. FLEMING.
COFFEE MILL.
No. 259,518. Patented June 13, 1882.
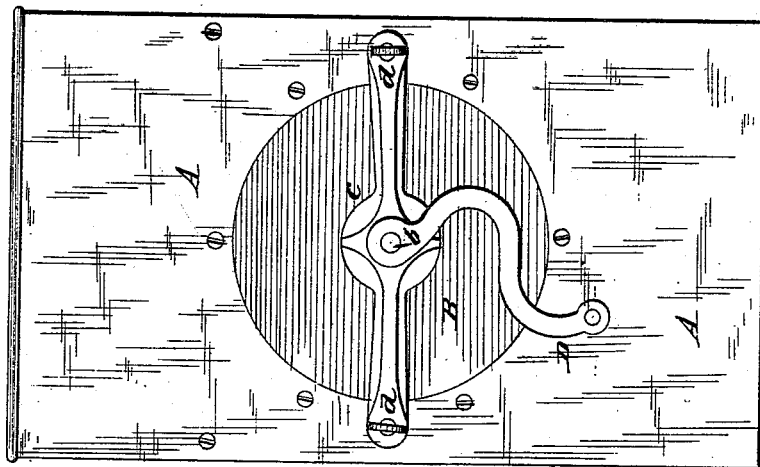
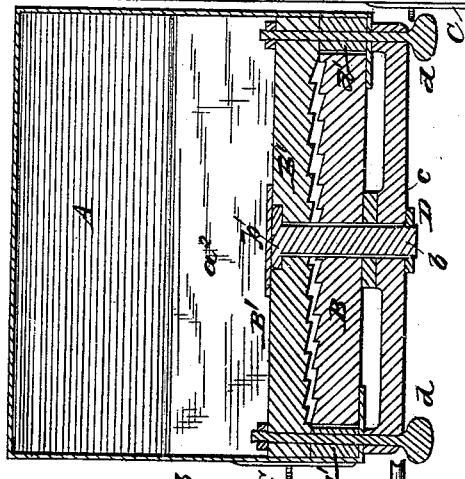
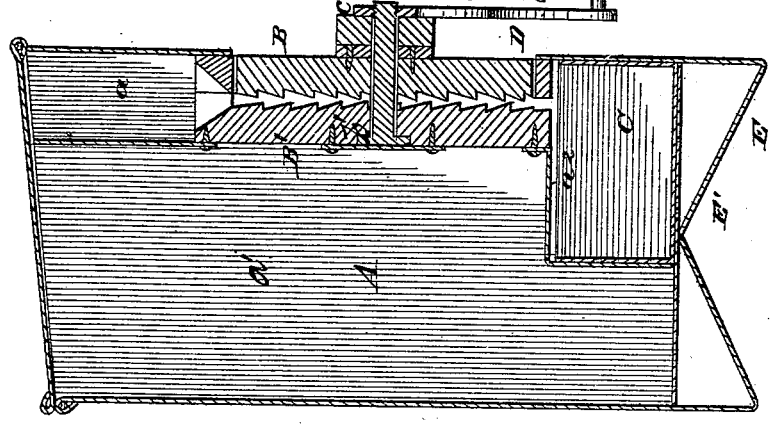
WITNESSES
Fred. G. Dieterich
John W. Stockett
INVENTOR
William H. Fleming
by Louis Bagger & Co.
Attorneys
N. PETERS, Photo-Lithographer, Washington, D. C.

UNITED STATES PATENT OFFICE.

WILLIAM H. FLEMING, OF THORP'S SPRING, TEXAS.

COFFEE-MILL.

SPECIFICATION forming part of Letters Patent No. 259,518, dated June 13, 1882.

Application filed October 31, 1881. (No model.)

*To all whom it may concern:*

Be it known that I, WILLIAM H. FLEMING, of Thorp's Spring, in the county of Hood and State of Texas, have invented certain new and useful Improvements in Coffee-Mills; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section of my improved coffee-mill. Fig. 2 is a horizontal section, and Fig. 3 is a side view, of the same.

This invention has relation to an improvement in coffee-mills; and it consists in the combination and arrangement of the parts, constructed substantially as hereinafter more fully set forth and claimed.

Referring to the accompanying drawings, A indicates the inclosing case or box of the grinding mechanism and other parts of the mill. This box is subdivided into a hopper, $a$, arranged directly above the grinding wheels or disks B B', into a chamber, $a'$, for holding the coffee in grains, and into a second chamber, $a^2$, for holding the sliding drawer C, which receives the ground coffee falling from the grinding-disks B B'. The inner disk, B', is secured in an upright position, its upper end being fastened to the lower end of the partition forming the compartment or hopper $a$, and its lower end fastened to a right-angled portion of the top of the chamber $a^2$, as seen in Fig. 1. The grinding-disk B is operated by the handle D, the shaft $b$ of which is supported by a disk, $b'$, affixed thereto and revolving in a covered recess or chamber in the grinding-disk B', and by a cross bar or bridge, $c$, detachably connected to the case or box A by screws $d$ passing through the front of the case and the disk or burr B', and through pieces $d'$ interposed between the inside of the front of the case and the burr B', as seen in Fig. 2. The screws $d$ are nutted upon the back of the burr or disk B'.

To the bottom of the box A are affixed legs E, having their inclined faces or sides E' facing inwardly and toward each other, as clearly shown, the object of which is to enable the box to be easily supported upon and to prevent its falling off the knee of the operator while grinding the coffee.

Having thus fully described my invention, I claim and desire to secure by Letters Patent—

In a coffee-mill, the combination of the case A, having the chambers $a'$ $a^2$ and the hopper $a$, the burr or grinding-disk B', fastened to the lower end of the inner side of the hopper $a$ and to the upper side or top of the chamber $a^2$, the burr or grinding-disk B, shaft $b$, having a disk, $b'$, revolving in a covered recess or chamber in the burr B', bridge $c$, screws $d$, and handle D, substantially as and for the purpose set forth.

In testimony that I claim the foregoing as my own I have hereunto affixed my signature in presence of two witnesses.

WILLIAM H. FLEMING.

Witnesses:
 ED H. FLEMING,
 R. F. HIGGINS.